(12) United States Patent
Sanchez, II

(10) Patent No.: US 6,915,520 B2
(45) Date of Patent: Jul. 5, 2005

(54) JAVA C++ PROXY OBJECTS

(75) Inventor: Humberto A. Sanchez, II, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 785 days.

(21) Appl. No.: 09/828,439

(22) Filed: Apr. 6, 2001

(65) Prior Publication Data

US 2004/0015849 A1 Jan. 22, 2004

(51) Int. Cl.[7] ............................................... G06F 9/44
(52) U.S. Cl. ..................................................... 719/315
(58) Field of Search ................................ 719/345, 315, 719/316, 330, 328; 709/315; 395/683; 717/114, 116; 707/103 R, 103 Y, 103 Z

(56) References Cited

U.S. PATENT DOCUMENTS

| | | | | |
|---|---|---|---|---|
| 5,642,511 A | * | 6/1997 | Chow et al. | 717/105 |
| 5,732,270 A | * | 3/1998 | Foody et al. | 719/316 |
| 5,862,328 A | * | 1/1999 | Colyer | 709/203 |
| 5,881,230 A | * | 3/1999 | Christensen et al. | 709/203 |
| 6,182,155 B1 | * | 1/2001 | Cheng et al. | 719/315 |
| 6,282,580 B1 | * | 8/2001 | Chang | 719/316 |
| 6,473,773 B1 | * | 10/2002 | Cheng et al. | 707/200 |
| 6,601,072 B1 | * | 7/2003 | Gerken, lll | 707/103 R |
| 2002/0112090 A1 | * | 8/2002 | Bennett et al. | 709/319 |

OTHER PUBLICATIONS

T. Reyelts, "Integrate Java and C++ with Jace", Java World, May 2002.*
"Advanced bridging between C/C++ and Java", http://www.noodleheaven.net/NoodleGlue/, no date given.*
Java Native Interface Specification, JavaSoft, May 1997.*
Twinpeaks White Paper: "Bring Together C++ and Java", May 1996, www.ilog.com/html/about_twinpeaks_white_paper.html.*
The Java Tutorial—Java Native Interface, 1998.*
Java and C+ +, Chapter 9, pp 151–181.

* cited by examiner

Primary Examiner—Sue Lao

(57) ABSTRACT

A system and method for enabling the efficient accessing of Java objects and methods by legacy GUIs is disclosed. The system and method provide a base proxy object that encapsulates the JNI APIs necessary for calling Java methods across the JNI boundary. Legacy proxy objects proxy the Java objects and enable legacy GUIs to issue method requests as if the legacy proxy objects were fully functional objects. The legacy proxy objects receive method requests from the GUIs and call base proxy object methods that in turn make the necessary JNI API calls to call Java methods.

20 Claims, 8 Drawing Sheets

<Implementation class>
MxTool

+MxTool(in env: JNIenv *, in javaObject : jobject, in className : string &)
+setName(in toolName : string &),
+getName() : string *
+setCreatedBy(in creatorID : long)
+getCreatedBy() : long
+setModifiedBy(in modifierID : long)
+getModifiedBy() : long
+setCreatedTime(in milliseconds: long long)
+getCreatedTime() : long long
+setModifiedTime(in milliseconds : long long)
+getModifiedTime() : long long
+setMultiSystemAware(in newFlag : bool)
+getMultiSystemAware() : bool
+set ToolLaunchable(in newFlag : bool)
+getToolLaunchable() : bool
+setDescription(in description: string &)
+getDescription() : string *
+setComment(in comment : string &)
+getComment() : string *
+setOwnedBy(in ownedBy : long)
+getOwnedBy() : long
+setExecutedBy(in executedBy : long)
+getExecutedBy() : long
+addFileCopyPair(in source : string &, in destination: string &)
+removeFileCopyPair(in source : string &, in destination : string &)
+getFiles() : pairVector_t *
+setFiles(in files: pairVector_t &)
+addRole(in newRole : long)
+replaceRoles(in newRoles : intVector_t &)
+addRoles(in newRoles : intVector_t &)

JAVA C++ PROXY OBJECTS

FIELD OF THE INVENTION

The invention relates to programming language interactions, and more specifically to legacy C++ GUI interactions with a Java environment.

BACKGROUND OF THE INVENTION

In many software systems today, the existing or legacy graphical user interfaces ("GUIs") are coded in C++ code. Over the past few years, however, Java® has become the programming language of choice. In order to use Java for providing the functionality of a system, the C++ GUIs must be made useable with Java. One alternative is to rewrite all of the lines of C++ code in Java. Rewriting the C++ code may comprise rewriting many lines of code. In many situations this is impractical. Furthermore, in many situations, it is desirable, practical, and cost-effective to maintain the C++ GUIs, instead of replacing them, and to use them to interface Java objects and methods of the Java functional code.

Accordingly, another alternative is to enable the C++ GUIs to make calls directly to the Java objects and methods in a Java Virtual Machine ("JVM") in the Java environment. The Java objects and methods control the functions of the computer systems. In order for the C++ GUIs to make calls directly to the Java objects and methods in the JVM, the C++ GUIs must make Java Native Interface ("JNI") Application Programming Interface ("API") calls across the Java to legacy boundary, as conceptually shown in FIG. 1. Likewise, Java data types must be converted to C++ data type, and vice-versa.

A solution to this requirement comprises coding JNI APIs and data type conversions into each of the C++ GUIs as required. This is disadvantageous because it litters or clutters the legacy C++ GUIs with the JNI API and data type conversion coding, bloating the size of the C++ GUIs and causing future maintenance problems. Moreover, many of the JNI APIs are repetitious among the C++ GUIs. Therefore, coding the JNI APIs into each of the C++ GUIs is inefficient. Additionally, when the C++ code is converted to Java, the JNI APIs must be deleted, as they will be unnecessary when the former C++ GUIs are on the Java side of the JNI.

SUMMARY OF THE INVENTION

The present invention comprises a system and method for enabling the efficient accessing of Java objects and methods by legacy C++ GUIs. A base proxy object according to the present invention encapsulates the JNI APIs necessary for calling the Java methods in order to manipulate the Java objects. The base proxy object also comprises the necessary mapping mechanism for converting Java data types to C++ data types, and vice-versa. The JNI APIs and mapping mechanism are contained in general functions coded into the base proxy object.

A method of efficiently accessing Java objects, classes and methods by legacy C++ GUIs according to the present invention comprises a C++ GUI obtaining a Java object, the base proxy object creating a C++ object that proxies the Java object, the C++ GUI executing a callback that sends a request, via the C++ proxy object, to the base proxy object. The request comprises the Java object name, a class name, a method name, a C++ data type and, if setting a Java attribute, data of the C++ data type. The base proxy object processes the request and makes the necessary JNI API calls to pass it to the JVM. The base proxy object obtains the Java method ID, calls the Java object, class and method, and gets or sets the Java attribute. If the callback gets an attribute, the base proxy object converts the retrieved Java attribute from the Java data type to the C++ data type and sends the converted attribute to the C++ proxy object. If the callback sets an attribute, the base proxy object converts the data from the C++ data type to the Java data type prior to sending the data through the JNI layer.

BRIEF DESCRIPTION OF THE FIGURES

The detailed description will refer to the following drawings, in which like numbers refer to like items, and in which:

FIG. 4b is a static structure diagram of an embodiment of C++ proxy object according to the present invention.

DETAILED DESCRIPTION OF THE INVENTION

Figure 1:
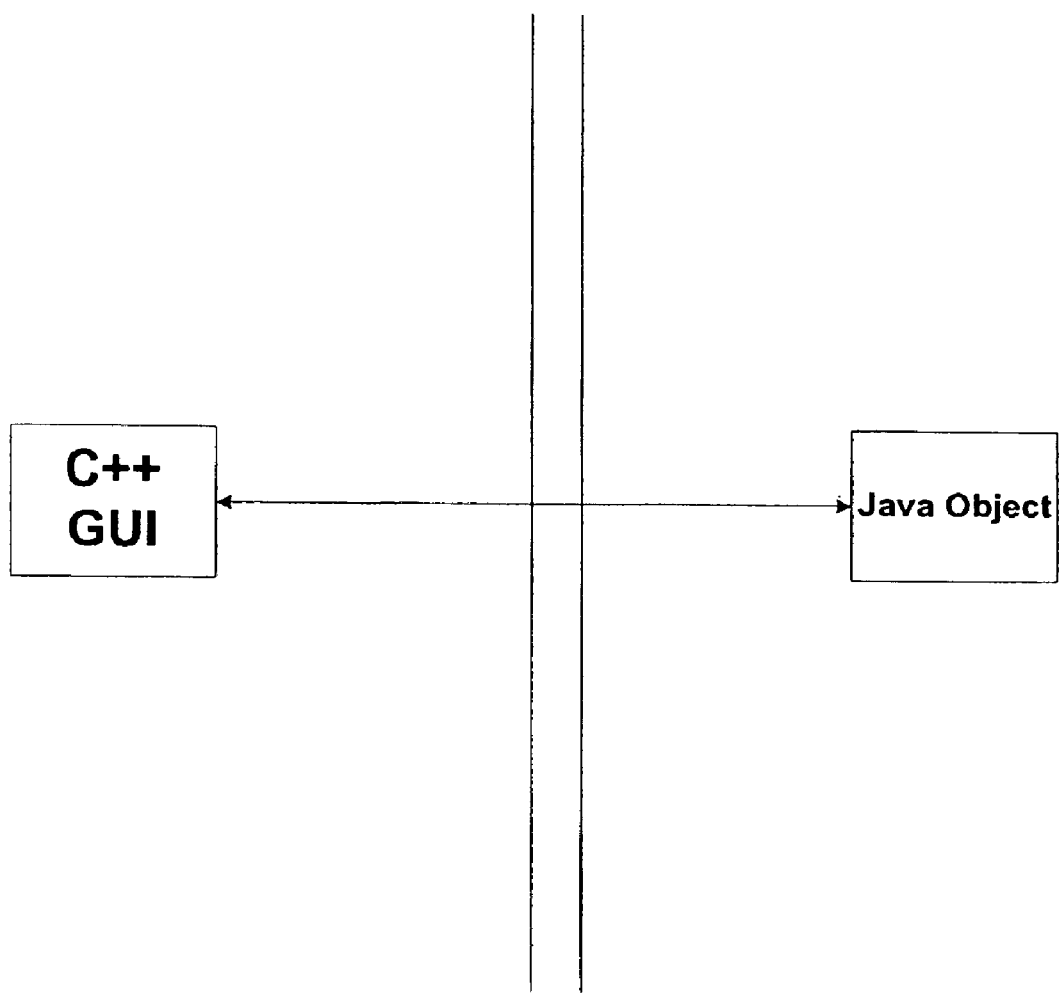
FIG. 1 is a block diagram conceptually illustrating legacy C++ GUI interaction with Java objects in a Java Virtual Machine.
Figure 2:
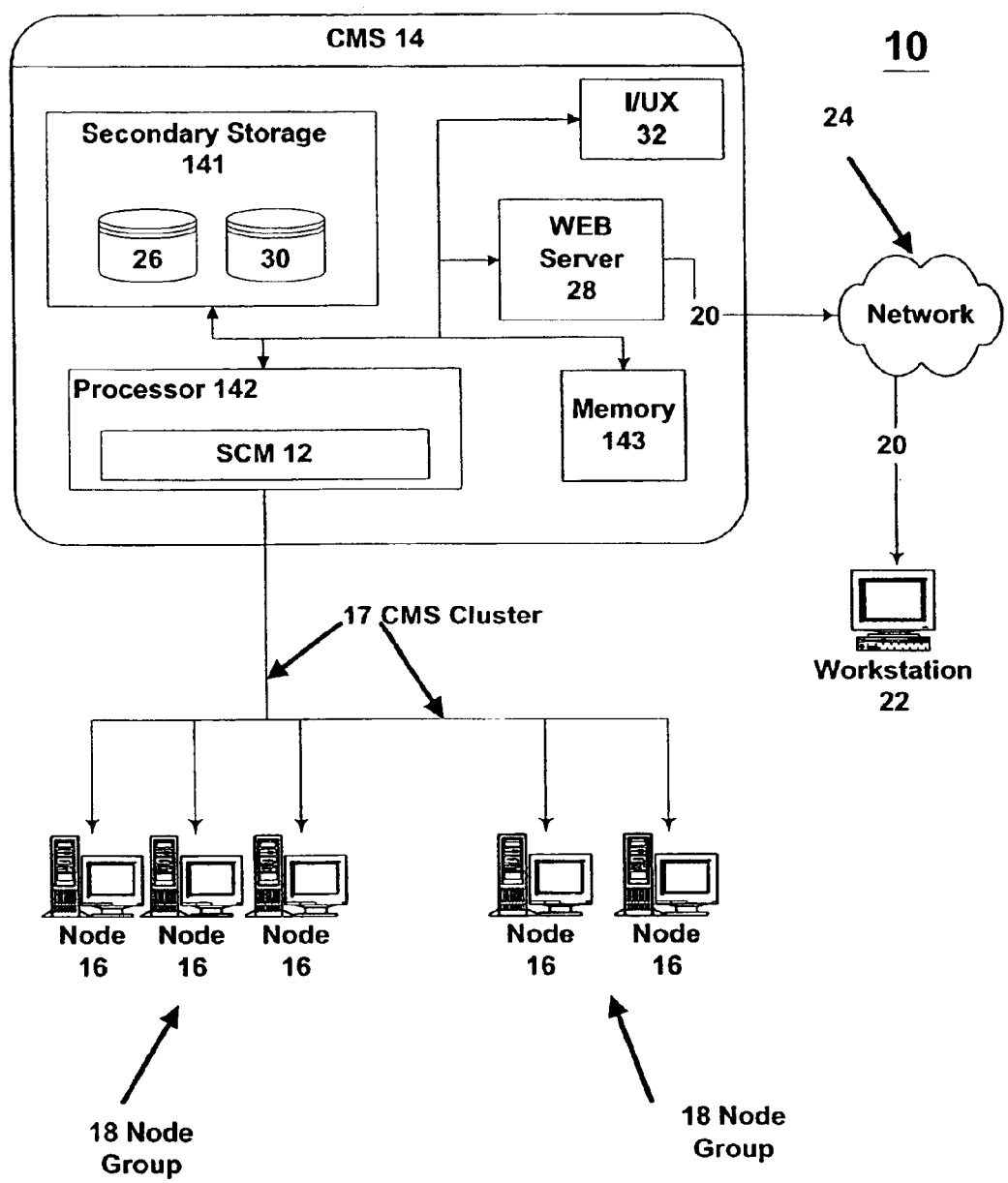
FIG. 2 is a block diagram of a computer system on which the present invention may be run.

The present invention may be used with computer systems that utilize C++ graphical user interfaces ("GUIs") to access Java objects across a Java Native Interface ("JNI"). FIG. 2 illustrates a computer network system with which the present invention may be used. The network system 10 comprises a ServiceControl Manager ("SCM") 12 running on a Central Management Server ("CMS") 14 and one or more nodes 16 managed by the SCM 12 on the CMS 14. Together the one or more nodes 16 managed by the SCM 12 make up a SCM cluster 17. A group of nodes 16 may be organized as a node group 18.

The CMS 14 preferably is an HP-UX 11.x server running the SCM 12 software. The CMS 14 includes a memory (not shown), a secondary storage device, a processor, an input device (not shown), a display device (not shown), and an output device (not shown). The memory, a computer readable medium, may include, RAM or similar types of memory, and it may store one or more applications for execution by processor, including the SCM 12 software. The secondary storage device, a computer readable medium, may include a hard disk drive, floppy disk drive, CD-ROM drive, or other types of non-volatile data storage. The processor executes the SCM 12 software and other application(s), which are stored in memory or secondary storage, or received from the Internet or other network 24, in order to provide the functions and perform the methods described in this specification, and the processing may be implemented in software, such as software modules, for execution by the CMS 14 and modes 16. The SCM 12 is preferably programmed in Java® and operates in a Java(& environment that is preferably accessed by using legacy C++ GUIs and the present invention. See *ServiceControl Manager Technical Reference,* HP® part number: B8339-90019, available from Hewlett-Packard Company, Palo Alto, Calif., which is hereby incorporated by reference, for a more detailed description of the SCM 12. The *ServiceControl Manager Technical Reference,* HP® part number: B8339-90019 is also accessible at http://www.software.hp.com/products/scmgr.

Generally, the SCM 12 supports managing a single SCM cluster 17 from a single CMS 14. All tasks performed on the SCM cluster 17 are initiated on the CMS 14 either directly or remotely, for example, by reaching the CMS 14 via a web connection 20. Therefore, a workstation 22 at which a user sits only needs a web connection 20 over a network 24 to the CMS 14 in order to perform tasks on the SCM cluster 17. The workstation 22 preferably comprises a display, a memory, a processor, a secondary storage, an input device and an output device. In addition to the SCM 12 software and the HP-UX server described above, the CMS 14 preferably also comprises a data repository 26 for the SCM cluster 17, a web server 28 that allows web access to the SCM 12 and a depot 30 comprising products used in the configuring of nodes, and a I/UX server 32.

The nodes 16 are preferably HP-UX servers or other servers. The nodes 16 may be referred to as "managed nodes" or simply as "nodes". Conceptually, the node 16 represents a single instance of HP-UX running on some hardware. The node 16 may comprise a memory, a secondary storage device, a processor, an input device, a display device, and an output device.

Although the CMS 14 is depicted with various components, one skilled in the art will appreciate that the CMS 14 may contain additional or different components. In addition, although aspects of an implementation consistent with the present invention are described as being stored in memory, one skilled in the art will appreciate that these aspects can also be stored on or read from other types of computer program products or computer-readable media, such as secondary storage devices, including hard disks, floppy disks, or CD-ROM; a carrier wave from the Internet or other network; or other forms of RAM or ROM. The computer-readable media may include instructions for controlling the CMS 14 (and/or the nodes 16) to perform a particular method, such as those described herein.

Java objects operating in a JVM provide the functionality of the SCM 12. In the system 10, when a user, through a C++ GUI, wants to access the functionality of the SCM 12 (e.g., to create, retrieve, save, delete or modify persistent data (e.g., in the data repository 26) of the Java objects or to run a tool on a node(s) or node group(s)), the C++ GUI executes a callback that causes a particular Java class to be instantiated, thus creating a particular Java object and a C++ object, that proxies the Java object. Java classes are meta-definitions that define the structure of a Java object. Java classes when instantiated create instances of the Java classes and are then considered Java objects. Methods within Java objects are used to get or set attributes of the Java object and to change the state of the Java object. Consequently, the C++ GUI may subsequently execute callbacks that execute methods on the proxy C++ object and that are processed by a base proxy object of the present invention to run the methods of the Java object to get or set attributes of the Java object, thereby creating, retrieving, saving, deleting or modifying data in the persistent store or running a tool on a node(s) or node group(s).

Some of the objects and classes discussed herein are named with a prefix "mx". The mx prefix is indicative of the application utilizing the objects and classes (e.g., the SCM 12) and is merely exemplary. Indeed, the names of classes, objects and methods discussed herein are exemplary, are not intended to be limiting, and are merely used for ease of discussion.

Figure 3:
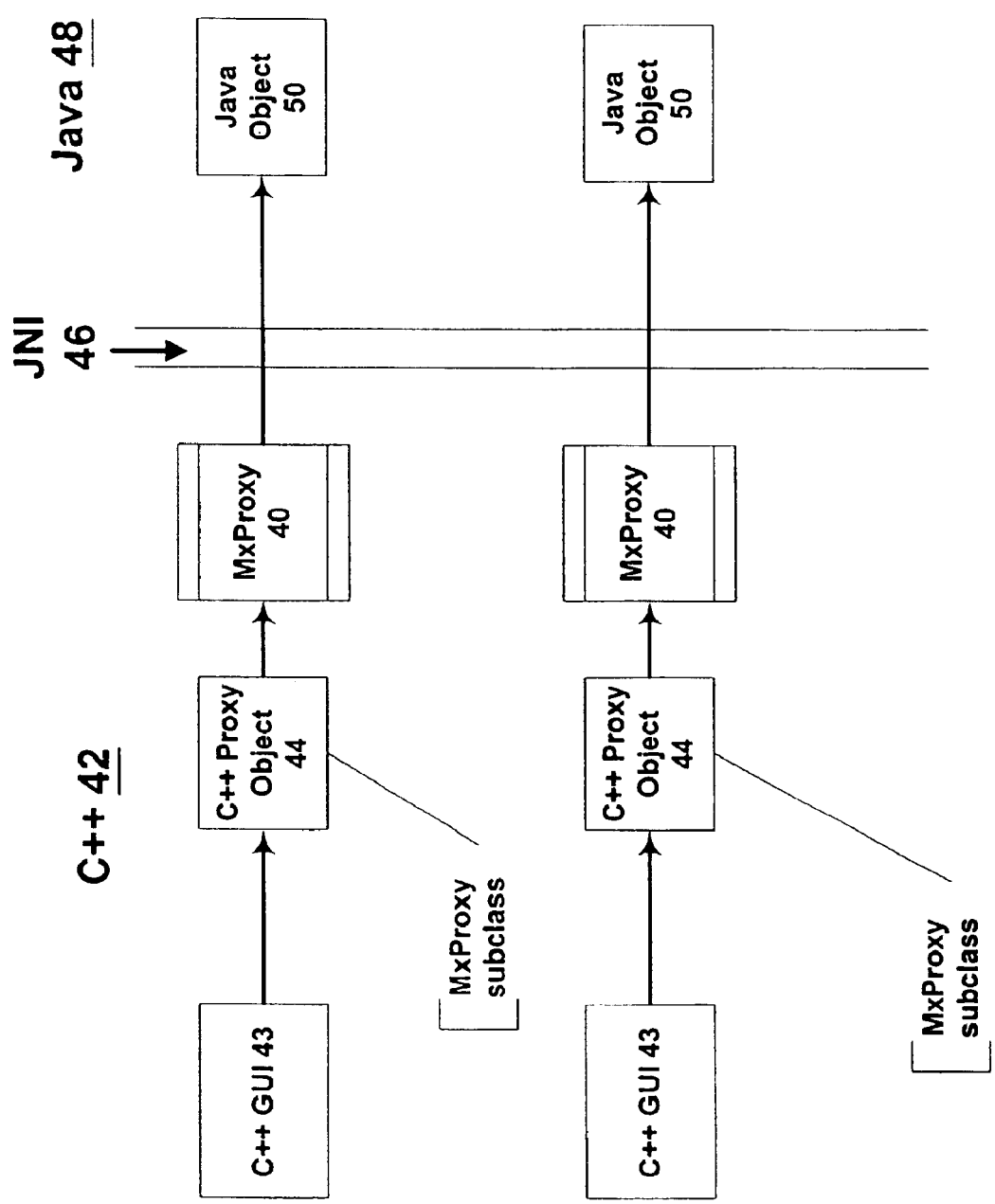
FIG. 3 is a block diagram conceptually illustrating a base proxy object according to the present invention.

FIG. 3 conceptually illustrates a base proxy object 40 and interactions between a C++ environment 42 and a JVM 48. For clearer understanding, the reference numbers used in FIG. 3 are used throughout this specification. In the present embodiment, a base proxy object 40 is coded in the SCM 12 software and stored in the CMS 14. The base proxy object 40 is shown in a C++ environment 42, with one or more C++ GUIs 43 and one or more C++ proxy objects 44, separated by a JNI boundary 46 from the JVM 48 and one or more Java objects 50 that each comprise one or more methods.

The C++ proxy objects 44 proxy the Java objects 50 and each C++ proxy object 44 is created when a C++ GUI 43 obtains a Java object 50, as described below. Accordingly, each C++ proxy object 44 includes methods that correspond to the methods of the Java object 50 that the C++ proxy object 44 proxies. The C++ proxy objects 44 also maintain names of the Java objects 50 that they proxy, identifying the Java classes that need to be instantiated to create instances of the Java objects 50. As is discussed below, when the C++ GUI 43 sends a request to a C++ proxy object 44 (i.e., executes a callback that executes a method on the C++ proxy object 44), the C++ proxy object 44 passes the method name, corresponding to the Java object 50 method name to the base proxy object 40. Each instance of a C++ proxy object 44, and the Java object 50 that the C++ proxy object 44 proxies, will exist for the duration of execution of the C++ GUI 43 that obtained the Java object 50.

Referring again to FIG. 3, the base proxy object 40 hides the mechanics of using the JNI from C++ consumers (GUIs 43) of Java objects. By hiding these mechanics, the base proxy object 40 makes it appear to C++ GUIs 43 that the C++ GUIs 43 are interacting with and manipulating fully functional C++ objects 44 when the C++ GUIs 43 execute callbacks to get or set attributes of the Java objects 50 that the C++ objects 44 proxy.

The base proxy object 40 is a base C++ class that provides a basic mapping mechanism. The C++ proxy objects 44 are sub-classes of the base proxy object 40. The base proxy object 40 preferably caches both Java Class IDs as well as Java Method IDs in order to minimize the number of C++ to Java Virtual Machine ("JVM") transitions. The base proxy object 40 preferably uses the C++ Standard Template Library (STL) to implement both the caching and "method name (Java) to method ID (Java)" mapping mechanisms.

As described above, a JNI API call is required for a C++ GUI 43 to access a Java object 50 across the JNI boundary 46. The base proxy object 40 preferably includes the JNI API calls necessary to access Java objects 50 requested by all of the C++ GUIs 43. The JNI API calls are coded into general functions (functions and methods are used interchangeably herein with regards to C++ objects) in the base proxy object 40 that call a Java method to either get or set an attribute of a specific type in the Java object being accessed (for exemplary general functions, see FIG. 4*a*). Coding the JNI API calls necessary to access Java objects 50 requested by all of the C++ GUIs 43 in the base proxy object 40 collects these JNI API calls in one class, instead of littering or cluttering each C++ GUI 43 with the JNI API calls necessary for that individual C++ GUI 43.

Collecting the JNI API calls in the base proxy object 40 has a number of advantages: for example, since some JNI API calls would otherwise be used by more than one C++ GUIs 43, collecting them in the base proxy object 40 prevents unnecessary repetition, allows generalization (e.g., getting a user name is generalized as getting a String with a specific method call) and increases efficiency; and, the C++ GUIs 43 are kept streamlined, which is especially advantageous if the legacy C++ GUIs 43 are ever converted to Java. Conversion of the legacy C++ to Java may basically comprise the re-writing of C++ syntax to Java syntax; by keeping the JNI API calls out of the C++ GUIs 43 and in the base proxy object 40, the base proxy object 40 and C++ proxy objects 44 may simply be removed when the legacy C++ is converted to Java. These and other advantages will become apparent throughout this specification.

Java data types and C++ data types are different. Therefore, when accessing the JVM 48 through the C++ environment 42, as illustrated by FIG. 3, it is necessary to map the Java data types to C++ data types. Accordingly, the base proxy object 40 comprises a mapping between Java data types and C++ data types. The mapping preferably used is shown in the following table:

TABLE 1

| Java Data Type | C++ Data Type |
| --- | --- |
| String | String |
| boolean (Bool) | bool |
| long | long long |
| int | long |
| Array of int | vector of long |
| Array of object | vector of proxy object |
| Array of String | vector of string |

The conversion according to this mapping is preferably coded into the base proxy object 40 general functions or methods, described above, that call a Java method to get or set an attribute of a specific type in the Java object being accessed.

Referring back to FIG. 3, the general interaction between the C++ GUIs 43, C++ proxy objects 44, the base proxy object 40 and the Java objects 50 is shown. Assuming that a C++ proxy object 44 proxying a Java object 50 has already been created (as described below), a C++ GUI 43 executes a callback that in turn executes a method on the C++ proxy object 44 (corresponding to a method of the proxied Java object 50) to get or set an attribute(s) in the proxied Java object 50. The C++ proxy object 44 passes control through the GUI callback to the base proxy object 40 as a method call with arguments including a Java object name, a class name, a method name(s), and the C++ data type of the output the C++ object 40 is getting or the input the C++ object 40 is setting. The Java object name, class name and method name(s) passed by the C++ proxy object 44 to the base proxy object 40 identify the proxied Java object 50, the Java class that defines the structure of the proxied Java object 50, and a method(s) of the Java object 50 that the C++GUI 43 needs to access. The base proxy object 40 processes the method arguments to access the Java object and to call the requested method(s) across the JNI boundary 46.

In order to call a Java method across the JNI boundary 46, a method ID for the Java method is required. The method ID is a unique identifier associated with a Java method that is established when the Java class containing the Java method is initialized. The method ID retains its value until the Java class containing the method ID is unloaded. The base proxy object 40 obtains the method ID across the JNI boundary 46 using the method name provided by the C++ proxy object. When a C++ proxy object 44 is first created (as described below) the method IDs and class ID are preferably dynamically obtained as instance data from the Java objects 50 and cached. When the method is subsequently called, the method ID may be accessed from the cache without having to access the method ID via the JNI, thereby reducing the number of C++ to JVM transitions. The cache may be a method data hash table, wherein the method data comprises the method signature and the method ID.

Accordingly, the base proxy object 40 preferably processes the method request by identifying the Java object 50 using the Java object name provided by the C++ proxy object 44, obtaining the method ID from the cache, and calling the Java object 50 and Java method(s) via the JNI 46, using the object name and method ID. If a set function is called, the base proxy object 40 will pass the input data supplied by the C++ GUI 43 to the Java object 50.

If the executed callback specifies a get function (i.e., returning an output from the Java object), the called Java method will return a Java data type output and the base proxy object 40 will convert the output to the C++ data type specified by the above mapping in Table 1. If the executed callback specifies a set function (i.e., sending input data to the Java object), the base proxy object 40 will convert the input data from a C++ data type supplied by the callback to the Java data type specified by the above mapping in Table 1 before sending the input data to the Java object 50.

Figure 4A:
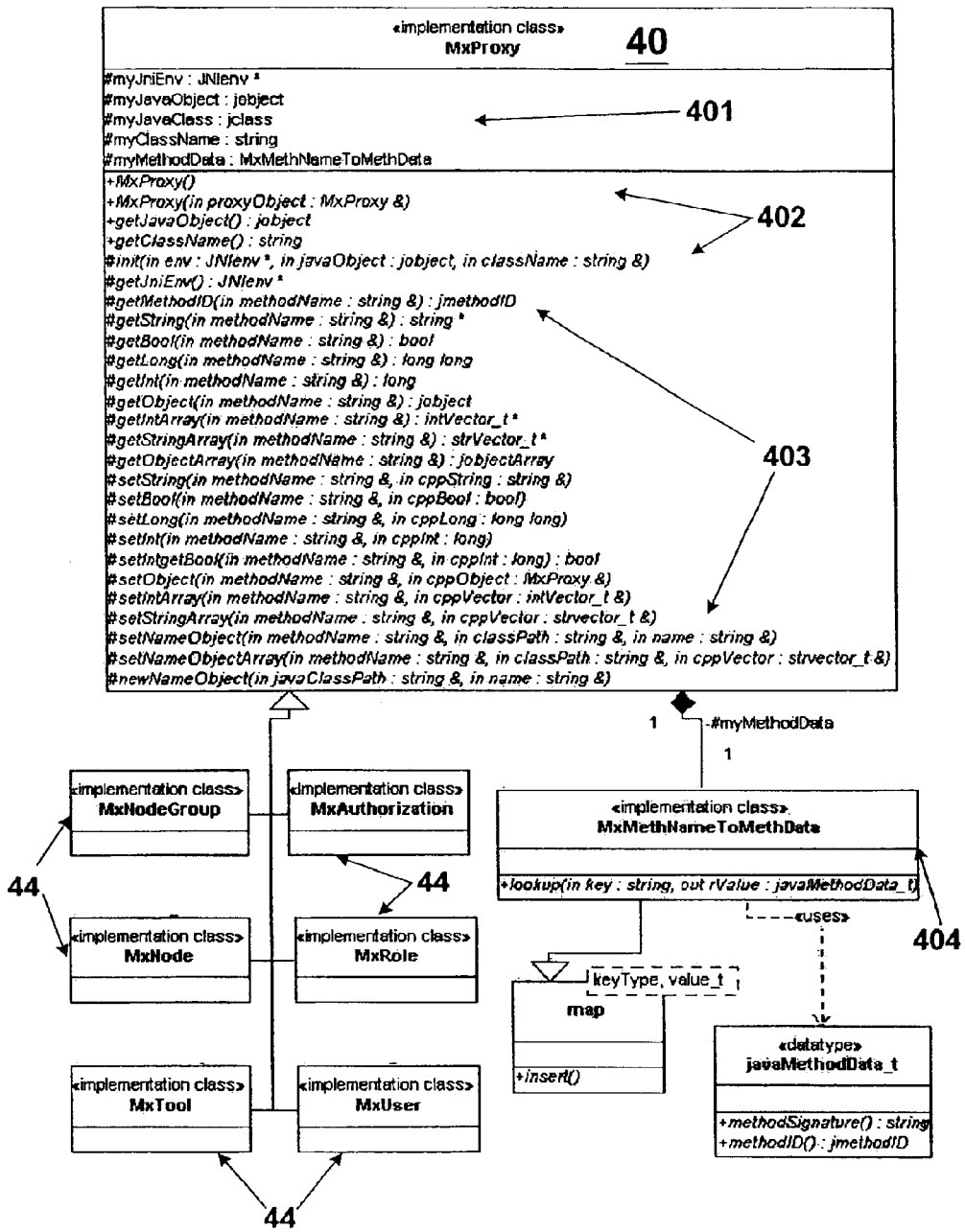
FIG. 4a is a static structure diagram of an embodiment of the base proxy object and interaction between C++ GUIs and Java objects according to the present invention.

FIG. 4a is a static structure diagram that illustrates an exemplary embodiment of the base proxy object 40. The base proxy object 40 is a base implementation class labeled 'MxProxy' in FIG. 4a. The base proxy object 40 comprises the following data variables 401: myJNIEnv, a JNI environment pointer obtained from an Object Action Manager ("ObAM") (alternatively, the JNI environment pointer may be obtained directly from JNI API calls); myJavaObject, a Java object reference to the Java object proxied by the C++ object 44 currently sub-classing the base proxy object 40; myJavaClass, a Java class reference to the proxied Java class; myClassName, the name of the proxied Java class; and, myMethodData, for accessing the method data hash table (containing the method IDs and signatures) for the proxied Java class. The Java object reference and the name of the proxied Java class are preferably provided by the C++ GUI 43 when it instantiates the C++ proxy object 44.

The base proxy object 40 also comprises base proxy object functions or methods 402 and the general functions or methods 403 mentioned above. The parameters of the functions 402 and 403 are shown within the parenthesis and the returned data or data type is shown after the colon. The base proxy object functions 402 include a constructor (init), a copy constructor (MxProxy), and getJavaObject, get ClassName, getJniEnv and getMethodID functions. The constructor is used to initialize the C++ proxy objects and is called by the C++ object constructors called below. The copy constructor is used to copy the C++ proxy objects if the C++ proxy objects are stored in vectors. The getJavaObject function returns the proxied Java object reference from the myJavaObject variable 401 so that it may be passed to the JVM. The getClassName function is used to return the Java class name from the myJavaClass variable 401. The getJniEnv function returns the JNI environment pointer returned from a call to ObamGetJNIEnv( ) or an appropriate JNI API call; the current JNI environment pointer is retrieved in order to make a call to the JNI API. The getMethodID provides a protected method for acquiring a method ID from an instantiated class (e.g., the proxied Java class).

The general functions 403 call a Java method to get or set an attribute of a specific type in the Java object being accessed. The inventors realized that getting or setting attributes of any Java object generally meant getting or setting a data of a particular data type by running a particular method. For example, the function getString(in method-Name: string &): string*, will return a pointer to a C++ STL string using the method identified by methodName, which is a string provided by the C++ proxy object 44, and return a pointer to a C++ string. As an example, assuming a C++ proxy object 44 MxUser with a method name called getUserName( ): string*, a C++ GUI callback method invocation comprising the name call getUserName( ): string* will be executed as a getString with getUserName as the methodName. The getString(getUserName) will retrieve a String from the Java method getUserName and convert the String to a C++ string for output to the C++ proxy object 44 and to the C++ GUI 43.

FIG. 4a also illustrates some of the C++ proxy objects 44 that are sub-classes from the base proxy object. The C++ proxy objects 44 are not created until a C++ GUI 43 (not shown in FIG. 4a) obtains a Java object 50 (not shown in FIG. 4a). However, the constructor functions (i.e., Mx{object}) that create the C++ proxy objects 44 and the methods (e.g., +setName(in toolName: string &)) that the C++ proxy objects 44 comprise are pre-coded (e.g., as part of the SCM 12 software). For example, MxTool is a C++ proxy object 44 that proxies a Java object 50 of the same name. MxTool is created when a C++ GUI 43 obtained an empty Java object 50 MxTool according to the process described below. For each instance of Java object 50 MxTool, there will be a corresponding C++ proxy object 44 MxTool. Consequently, each time a C++ GUI 43 creates a new tool or wishes to modify (e.g., change or delete) an existing tool, a Java object 50 MxTool and C++ proxy object 44 MxTool will be created and exist for the duration of execution of the C++ GUI 43.

In a preferred embodiment, a plurality of Java objects 50 provide functionality for a computer system. Related to the Java objects 50 are a corresponding number of C++ proxy objects 44 that proxy the Java objects 50. In the computer network system 10 illustrated in FIG. 2, the SCM 12 includes the following C++ proxy objects 44 proxying Java objects 50 with the same name: MxUser, MxUserName, MxNode, MxNodeName, MxIPAddress, MxNodeGroup, MxNodeGroupName, MxTool, MxToolName, MxToolGroupName, MxToolToolGroupPair, MxFileCopyPair, MxParameter, MxRunnableTool, MxTaskStatus, MxTargetStatus, MxTargetOutput, MxAuthorization, MxRole, MxRoleName, MxString. Consequently, C++ GUIs 43 may access all of the Java objects 50 with the above names, through the corresponding C++ proxy objects 44 and the base proxy object 40.

A method data hash table 404 (e.g., MxMethNameToMethData) is also shown in FIG. 4a. MxMethNametoMethData is an object that is a data member in the C++ base proxy class 40. Initially, MxMethNametoMethData is an empty hash table 404. Each C++ proxy object 44, such as MxNode, preferably has a method info array (e.g., an array methodInfo_t object) that is a subset of data that goes into the MxMethodNametoMethData hash table 404. The methodInfo_t data preferably contains the method name and signature. Preferably, the methodInfo_t data does not include the method ID, since this is obtained dynamically, as described herein. The methodInfo_t data is placed inside the hash table 404 in order to provide fast and efficient access to the methodInfo_t data.

As implied by the name MxMethNameToMethData, the method name is the key to the hash table 404 and the methodInfo_t data is retrieved from the hash table 404 simply by using the method name. If the methodInfo_t data were left as an array, this array would have to be linearly searched to locate the correct data. The methodInfo_t data is entered into the hash table 404 by passing the methodInfo_t object to the MxMethNameToMethData object and asking the MxMethNameToMethData object to populate itself with the passed methodInfo_t object.

FIG. 4b illustrates an exemplary C++ proxy object 44, MxTool, including MxTool's constructor function and get/set functions. Other C++ proxy objects 44 likewise comprise a constructor function and get/set functions. As shown in the static structure diagram in FIG. 4b, MxTool comprises methods 441 for creating and modifying tools that are used in the network system 10 and with the SCM 12 described above. To create a tool, a C++ GUI 43 issues a request with the appropriate user-entered data (e.g., tool name, created by, created time (e.g., as determined by the network system 10), description, etc.) as the method parameters (in the parenthesis) to the MxTool C++ proxy object 44. The executed C++ GUI 43 callback makes the necessary method calls (e.g., setName(in toolName: string &), setCreatedBy (in creatorID: long), set CreatedTime(in milliseconds: long long), setDescription(in description: string&), etc.), on the MxTool C++ proxy object 44 that have the effect of calling the proxied Java object 50 through the base proxy object 40. The base proxy class 40 processes the method request(s) and makes the necessary JNI API calls, sending the appropriate Java methodIDs and making the appropriate data type conversions. Other C++ GUI 43 method calls (requests) to the other C++ proxy objects 44 work in a similar manner.

Another advantage of the base proxy object 40 of the present invention is that it is customizable. Since it is customizable, the base proxy object 40 may be used in any system in which a C++ to Java transition similar to that described above takes place. The base proxy object 40 may be customized by adding or removing base proxy object functions 402 or general functions 403. For example, the base proxy object 40 shown in FIG. 4a does not include getting or setting of floats. If a particular system required the getting or setting of floats, getFloat and/or setFloat functions could be added to the base proxy object 40. Likewise, additional or different the C++ proxy objects 44 may be implemented to mirror additional or different Java objects 50, as determined by the particular needs of the computer system (e.g., network system 10) with which the invention is used.

Figure 5:
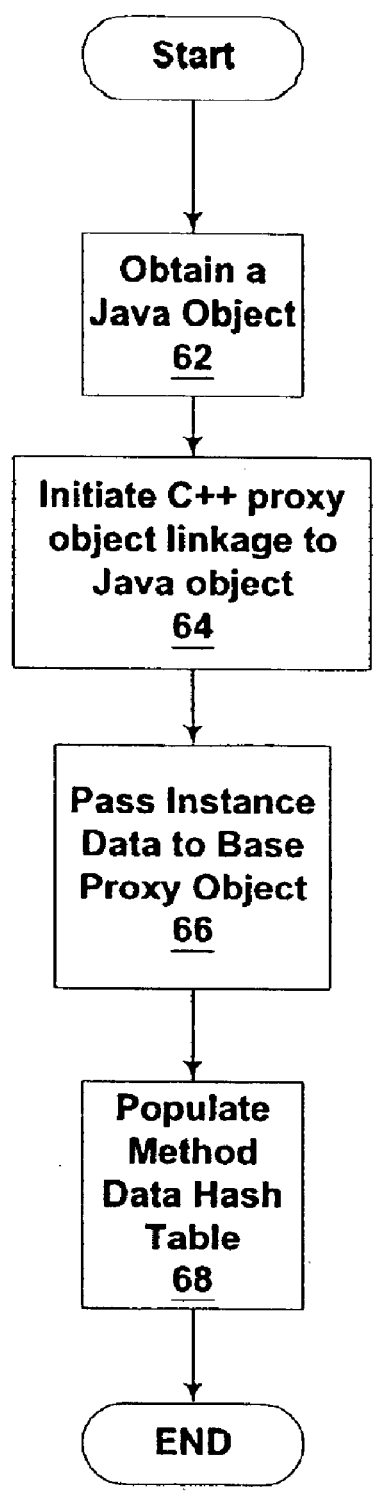
FIG. 5 is a flowchart of a method for creating a C++ proxy object according to the present invention.

FIG. 5 illustrates a method 60 for creating a C++ proxy object 44 comprising a C++ GUI 43 obtaining a Java object 62, initiating C++ proxy object linkage to the Java object 64 and passing instance data to the base proxy object 66. The obtaining step 62 may comprise instantiating a Java class to create a Java object 50 in the JVM 48. The C++ GUI 43 may accomplish this via a JNI call that returns a Java object (e.g., GetObjectArrayElement) or via a call to an Objectifier. The Objectifier is a Java object that is a mapping layer that maps C++ procedural code to Java object-oriented classes and that creates new Java objects based on procedural calls from C++ GUIs 43, among other things.

When the new Java object is obtained, the JNI environment pointer, Java object name and Java class name are returned as a call to the C++ environment 42, therefore executing a constructor function to create and link a C++ proxy object 44 to the Java object 50. Accordingly, the initiating C++ proxy object linkage to the Java object 64 may comprise calling the appropriate constructor function with the JNI environment pointer, Java object name and Java class name as parameters to create and link a C++ proxy object 44 to the new Java object 50. For example, a call comprising the Java object name MxUser will execute a constructor that creates a C++ proxy object 44 of the same name (MxUser). The new C++ object MxUser will be linked, and therefore will proxy, the Java object MxUser.

When created, the new C++ proxy object 44 calls a constructor in the base proxy class 40 to initialize the instance data and to create global references for the proxied Java object 50. Therefore, the passing instance data to the base proxy object 66 may comprise the new C++ proxy object 44 calling the init function in the base proxy object and passing the JNI environment pointer, the Java object name and the Java class name with the init call (see FIG. 4a). The method 60 may also comprise a step of populating a method name to method date hash table 68. The hash table links method names with method data (e.g., method signature). The populating step 68 preferably comprises the new C++ proxy object 44 passing method names and method data to the hash table 404. The method names and method data are instance data of the new C++ proxy object 44. As noted above, maintaining the method data in the hash table 405 enables easier access to the method data by the base proxy object 40 and reduces the number of JNI API calls necessary.

Figure 6:
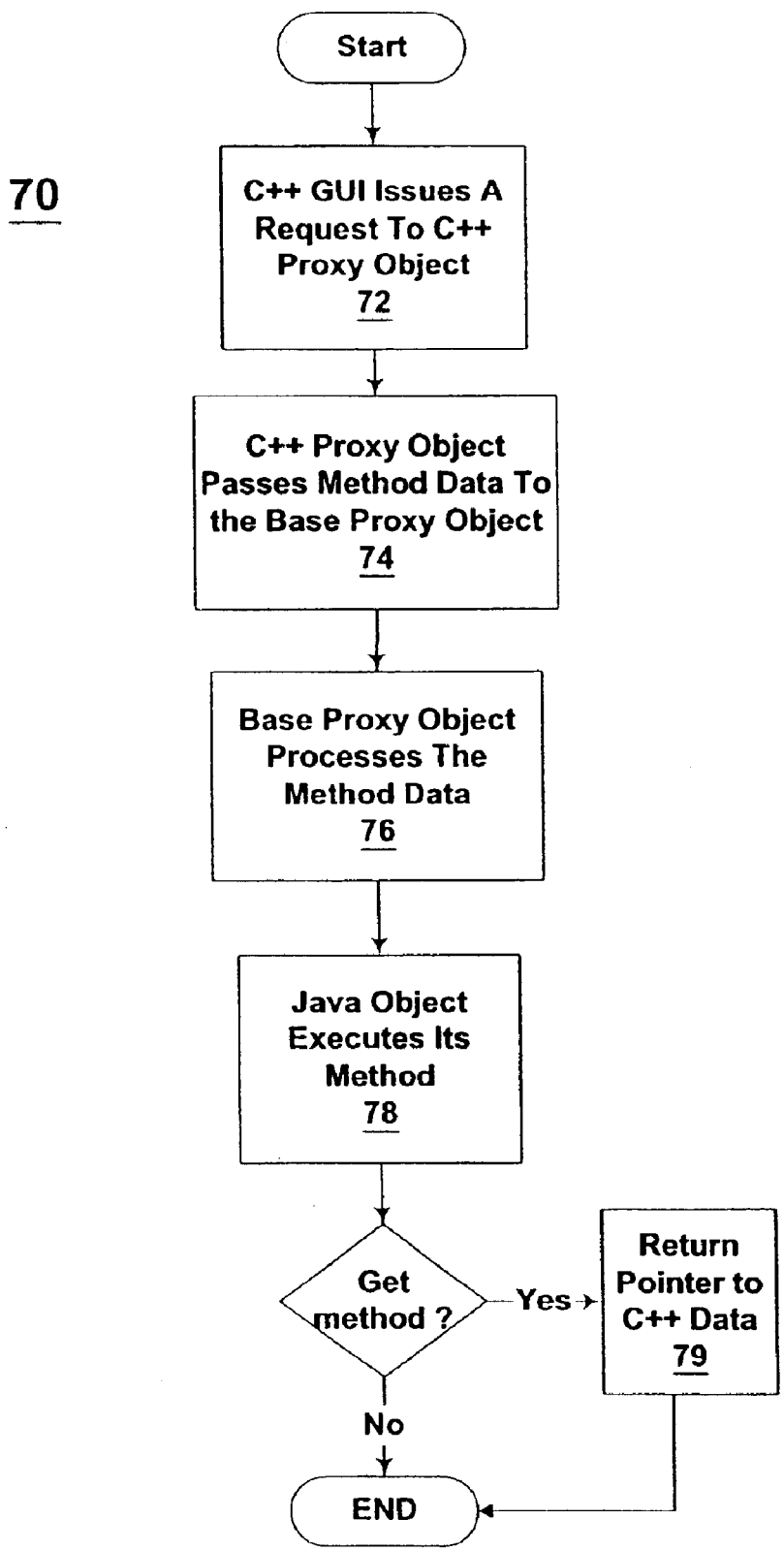
FIG. 6 is a flowchart of a method of using the base proxy object to facilitate C++ GUI access to Java objects according to the present invention.

After a Java object 50 and its proxy, the C++ object 44, have been created, the C++ GUI 43 can get/set attributes in the Java object 50, through the C++ proxy object 44 and the base proxy object 40. FIG. 6 illustrates a method 70 for getting/setting attributes in the Java object 50. The method 70 corresponds to the general interaction between the C++ GUIs 43, C++ proxy objects 44, the base proxy object 40 and the Java objects 50 shown in FIG. 3 and described above. The method 70 comprises a C++ GUI issuing a request to a C++ proxy object 72, the C++ proxy object passing method data to the base proxy object 74, the base proxy object processing the method data 76 and the Java object executing a Java method 78. The method steps may be performed as described above with reference to FIGS. 3, 4a and 4b and as illustrated by the exemplary sequence diagram described below.

Accordingly, issuing a request to a C++ object 72 preferably comprises the C++ GUI 43 invoking a method call on the C++ proxy object 44 and providing the user entered data as the necessary parameters of the invoked C++ proxy object 44 method. The invoked C++ proxy object 44 method corresponds to the Java object 50 method that needs to be invoked to get or set attributes of the proxied Java object 50.

Passing method data to the base proxy object 74 preferably comprises the C++ proxy object 44 processing the method call invoked by the C++ GUI 43 and calling a base proxy object 40 method. The C++ proxy object 44 includes the method data (e.g., Java method name and the user entered data) in the base proxy object 40 method call. The C++ proxy object 44 method invoked by the C++ GUI 43 determines the base proxy object 40 method called. For example, a common C++ proxy object 44 method, setCreatedBy(const long uid):void, invoked by the C++ GUI 43 to set the uid of a created Node, User, Tool, etc., will call the base proxy object 40 method setInt(const string & methodName, const long cppInt): void when processed, since a uid has a C++ data type long that maps to Java data type Int (as seen in Table 1 above). Consequently, setting the Creating By attribute is basically setting a Java int.

Processing the method data 76 preferably comprises the base proxy object 40 executing the called method, getting the Java method ID using the method name provided by the C++ proxy object 44, issuing necessary JNI API calls with the method ID to call the Java method indicated by the method ID, and converting C++ data to Java data (and vice-versa). Executing a Java method 78 preferably comprises a Java object 50, which is proxied by the C++ object 44, executing the Java method called by the base proxy object 40 and identified by the method ID. If the Java method is a get method, the Java object 50 returns a pointer to the C++ data 79.

Figure 7:
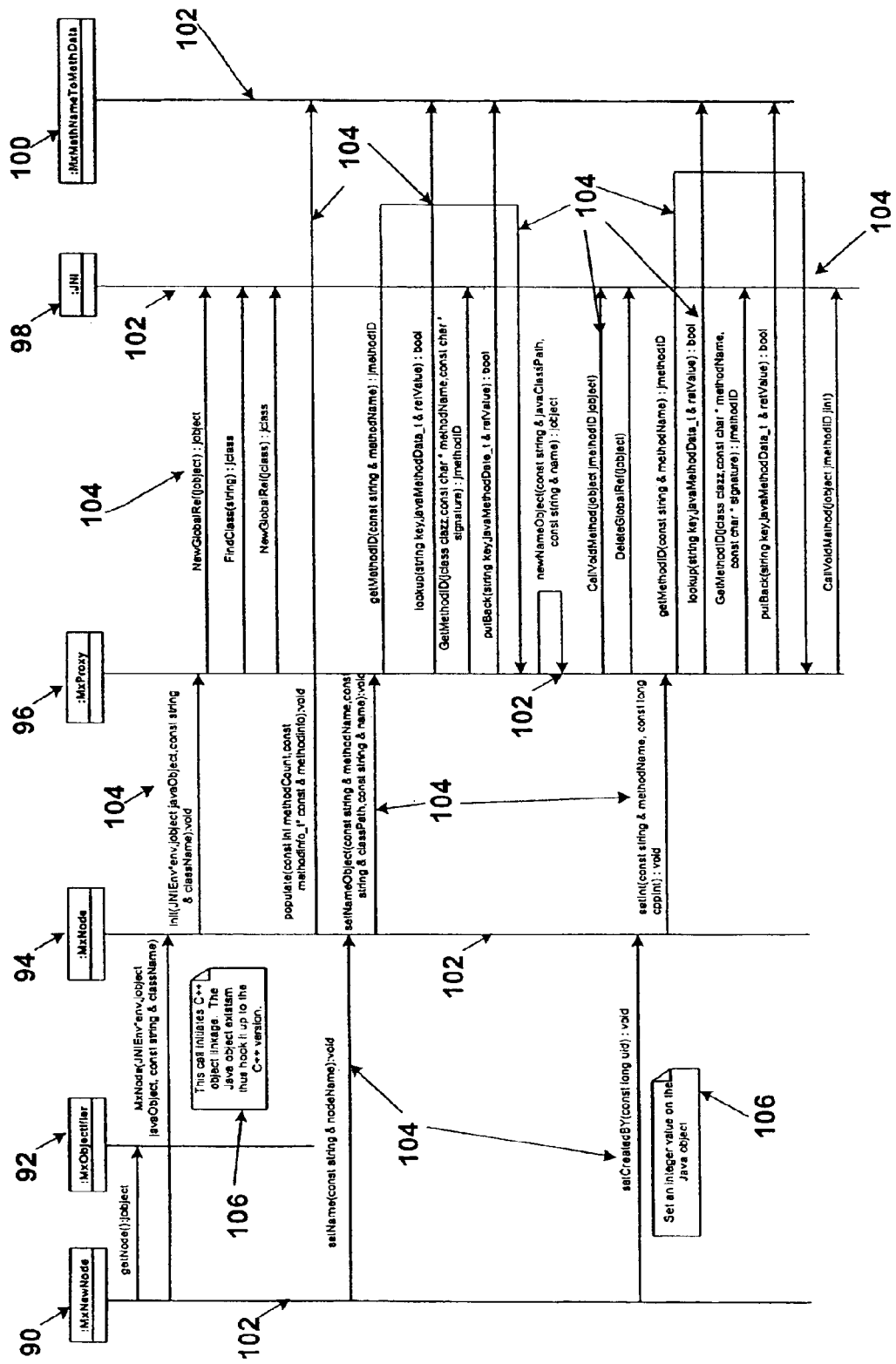
FIG. 7 is a sequence diagram illustrating the use of the base proxy object according to the present invention.

FIG. 7 is a sequence diagram detailing an exemplary process according to the present invention utilizing the base proxy object 40 to get and set attributes of a Java object 50 via a C++ GUI 43. The sequence diagram illustrates boxes representing an MxNewNode (a C++ GUI 43) 90, an MxObjectifier 92 (the Objectifier described above), a MxNode (a C++ proxy object 44) 94, a MxProxy (the base proxy object 40) 96, a JNI (the JNI boundary 46) 98 and a MxMethNameToMethData 100 (the method data hash table 405 discussed above). The representative boxes 90–100 are shown with vertical time-lines 102 running from the boxes 90–100 and horizontal call lines 104 running from the appropriate initiating GUI, object, etc. time-line 102 to the appropriate target object, layer, map, etc. time-line 102. The horizontal call lines include a method, with the method parameters within parenthesis and the returned data following a colon. The vertical position of the call lines 104 indicates their sequential order of initialization and execution. The length of the vertical time-line 102 indicates the period of execution of the GUI, object, layer, map, etc. represented by the box 90–100 from which each time-line 102 descends. Also shown are notation boxes 106 that comprise various comments. The sequence diagram of FIG. 7 is described below moving left to right and top to bottom.

In the exemplary process shown, the MxNewNode box 90 represents a C++ GUI 43 that may be used to enter data to create a new node in the network system 10. As seen in FIG. 7, the MxNewNode GUI 43 issues a call (shown by the getNode( ):jobject call line 104) to obtain a Java object 50. As noted above, a C++ GUI 43 may obtain a Java object 50, for example, via a JNI call that returns a Java object or via a call to the Objectifier. In the present example, as noted by the associated notation 106, the MxNewNode GUI obtains the Java object 50 via a call to the Objectifier (represented by MxObjectifier box 92). A new, empty MxNode Java object 50 is thus created in the JVM 48.

The Objectifier returns the new, empty MxNode Java object 50 as a call to the C++ environment 42. This call is illustrated by the MxNode(JNIEnv*env,jobject javaObject, const string & className) call line 104 extending from the MxNewNode 90 vertical time-line 102 to the MxNode 94 time-line 102. If the Java object 50 were returned by a JNI call, or in another manner, the Java object 50 would also be returned to the C++ environment 42 as a call. As noted by the associated notation 106, the MxNode call initiates C++ proxy object 44 linkage by calling the appropriate constructor function (i.e., MxNode) in the C++ environment 42. With the parameters provided within the parenthesis, the MxNode call links the new MxNode C++ proxy object 44 to the new MxNode Java object 50.

The MxNode box 94 represents the new MxNode C++ proxy object 44 created by the MxNode call. The new MxNode C++ proxy object 44 issues a call to the base proxy class 40 invoking a function in the base proxy class 40 (i.e., the init function) to initialize the instance data and to create global references for the proxied Java object 50. This function call is shown by the init(JNIEnv*env, jobject javaObject, const string & className): void call line 104. The ":void" indicates that the method call returns a void (i.e., nothing). The env is the JNI Environment pointer obtained from ObAM or directly via a JNI API call (as discussed above), the javaObject reference is the Java object reference obtained by the GUI (e.g., from the Objectifier) and the className is the name of the proxied Java class also provided by the GUI.

As noted above, the init function initializes the instance data and creates global references for the proxied Java object 50 and class. Accordingly, the base proxy object 40, represented by the MxProxy box 96, issues appropriate JNI API calls that are coded into the init function. These JNI API calls are illustrated by the NewGlobalRef(jobject):jobject, FindClass(string):jclass, and NewGlobalRef(jclass): jclass call lines 104. The NewGlobalRef call passes the jobject reference included in the init function call. The FindClass call passes the className string included in the init function call. The NewGlobalRef call passes the jclass reference obtained by the FindClass call.

Once the instance data is initialized and global references are created, the new MxNode C++ proxy object 44 issues a call to populate the method data hash table 405 (represented by the MxMethNametoMethData box 100) with the method data from the proxied Java class. The method data includes a count (methodCount) of the number of methods in the methodInfo_t array and a pointer (methodInfo_t*) to the methodInfo_t array. The methodInfo_t array includes the method name and signatures. The C++ proxy object 44 issues this call since the method data, method names, and method signatures are embedded as instance data in the C++ proxy object 44 and the method data hash table 405 is preferably visible to all base proxy object 40 sub-classes. This call is illustrated by the populate(const int methodCount, const methodInfo_t*const & methodInfo) :void call line 104. As noted above, the method name is used as a key to access the method data populated in the hash table 405.

After the above steps are executed, the C++ GUI 43 may issue a method execution request to set the name of the Java object 50, as shown in FIG. 7. This request is illustrated by the setName(const string & nodeName): void call line 104 extending from the MxNewNode vertical time-line 102. The setName request is passed to the MxNode C++ object 44. The string in the request is the name of the MxNode Java object 50 created above that is to be set.

The MxNode C++ proxy object 44 passes the request to the base proxy object 40. The setString method of the base proxy object (see FIG. 4a above) is preferably used to set the name of the Java object 50, since the setString method makes calls on the proxied Java object 50. To set the name of the node, an MxNodeName object 50 is preferably instantiated. Therefore, the method data (i.e., method name and Java class ID for the MxNodeName Java object 50) is passed to the base proxy object 40 via a setNameObject call, shown by the setNameObject(const string & methodName, const string & classpath,const string & name): void call line 104. The setNameObject call causes the setNameObject method in the base proxy object 40 to be executed.

Consequently, the setNameObject method comprises getting a method ID for the method of the MxNode Java object 50 that sets the name attribute of the MxNode Java object 50 and creating a new Java name object from the string specified in the C++ GUI setName method request by calling the Java method that sets the name attribute with the new Java name object.

The getMethodID and GetMethodID call lines 104 show the getting a method ID step. The first time getting a methodID, the base proxy object 40 gets the method ID by crossing the JNI boundary 46 using the proxied java class ID, the methodName string and the method signature, all provided by the C++ proxy object 44. Subsequently, the methodID is cached in the method data hash table, from which it may be retrieved as needed.

Referring to FIG. 7, the base proxy object 40 first calls its own getMethodID method (as indicated by the self-referential getMethodID call line 104 that indicates that MxProxy is the method initiator and target). The invoked getMethodID(string & methodName):jmethodID function calls the hash table 405 (the MxMethNameToMethData object) using the method name as a key. This call retrieves a methodInfo_t object linked to the method name. The "getMethodID" function looks inside the methodInfo_t object and if it finds a non-null java method ID, then the method ID has already been obtained and the getMethodID function does not need to make the call to the JNI 46. The "cached" method ID is simply returned. If however, the java method ID is null, the getMethodID function makes the call to the JNI 46 and caches the returned ID in the methodInfo_t object, and then puts the methodInfo_t object back into the hash table 405 (the MxMethName-ToMethData object) for later use if so requested. Then the getMethodID function returns the method ID to the caller.

Consequently, FIG. 7 illustrates the lookup (lookup(string key,javaMethodData_t & retValue):bool ), the JNI call (GetMethodIDjclass clazz,const char*methodName,const char*signature):jmethodID) and the put back of the methodInfo_t object (putBack(string key, javaMethodDate_t & refvalue) : bool) since the method ID has not been previously retrieved and cached.

The newNameObject(const string & javaClassPath, const string & name):jobject is a self-referential method that calls the constructor of a Java name object (e.g., MxNodeName) that takes the Node name string provided by the C++ GUI 43 and returns a Java object global reference, jobject, to the constructed Java name object. The newNameObject method converts the C++ string provided by the C++ GUI 43 to a Java string, finds the method ID of the Java name object constructor, invokes the constructor to create the Java name object and creates a global reference to the new Java name object (not shown in FIG. 7). The CallVoidMethod calls the Java method that sets the name of the MxNode Java object 50. As shown, the parameters include the global reference of the MxNode Java object 50 (i.e., the firstjobject), the Java method ID, (i.e., the jmethodID), and the global reference of the Java name object MxNodeName (i.e., the second jobject). The CallVoidMethod is the JNI API call to the JVM, in which the method identified by the jmethodID (i.e., the method of the MxNode Java object 50 that sets the name attribute of the MxNode Java object 50) is called. Once the name of the MxNode Java object 50 has been set, the global reference of the Java name object MxNodeName is no longer needed. Accordingly, the base proxy object issues a DeleteGlobalRef(jobject) call to delete the jobject global reference of the Java name object MxNodeName.

Once the Java object 50 and its proxy, the C++ object 44, have been created, the C++ GUI may get/set attributes of the Java object 50. Again referring to FIG. 7, the MxNewNode GUI 90 issues a method call to set the created by attribute of the Java object 50. This method call is shown by the setCreatedBy(const long uid):void call line 104. Therefore, this calls the setCreatedBy function in the MxNode C++ object 44, passing a C++ long user id (uid).

Since a C++ long is mapped to a Java int, the MxNode C++ proxy object 44 passes the parameter to the base proxy object 40 by calling a setInt function. This is shown by the setInt(const string & methodName, const long cppInt): void call line 104. As seen, the setInt call includes a string for the method name and the C++ long for the Java Int as parameters. In this example, the method name is MxNode.setCreatedBy (i.e., the MxNode Java object 50 method that sets the uid (userid) identifying the user that created the node object).

When received by the base proxy object 40, the setInt method gets the method ID of the method in the MxNode Java object 50 that sets the setCreatedBy attribute. Once the method ID (jmethodID) is returned (by the self-referential getMethodID method call shown), the base proxy object calls the method, passing the method ID and the long uid (converted to a java Int jint) to the MxNode Java object 50. This is illustrated by the CallVoidMethod(jobject jmethodID jint) call to the JNI. The jobject parameter is the global reference to the MxNode Java object 50.

While the invention has been described with reference to the exemplary embodiments thereof, those skilled in the art will be able to make various modifications to the described embodiments of the invention without departing from the true spirit and scope of the invention. The terms and descriptions used herein are set forth by way of illustration only and are not meant as limitations. Those skilled in the art will recognize that these and other variations are possible within the spirit and scope of the invention as defined in the following claims and their equivalents.

What is claimed is:

1. A computer system that enables the efficient accessing of Java objects and methods by C++ graphical user interfaces, the computer system comprising:
   a processor that runs a software program, wherein the software program generates:
      a Java Virtual Machine;
      a Java Native Interface ("JNI") boundary; and
      a C++ environment, wherein a JNI application programming interface ("API") call across the JNI boundary is required to access the Java Virtual Machine from the C++ environment, the C++ environment comprising:
         a graphical user interface, wherein the graphical user interface comprises callback code that is executed to issue one or more method requests; and
         a base proxy object, comprising one or more functions that encapsulate one or more JNI API calls necessary to call a Java method in the Java Virtual Machine based on the one or more method requests of the graphical user interface.

2. The computer system of claim 1, wherein the Java Virtual Machine comprises:
   a Java object, comprising:
      an attribute; and
      one or more methods that are executed to enter, retrieve or modify the attribute; and
      wherein the base proxy object makes the one or more JNI API calls across the JNI boundary to call the one or more methods of the Java object based on the one or more method requests of the graphical user interface.

3. The computer system of claim 2, wherein the C++ environment further comprises:
   a C++ proxy object that proxies the Java object, the C++ proxy object comprising:
      one or more methods that correspond to the one or more methods of the Java object and that call one or mere functions of the base proxy object when executed, wherein the one or more methods of the C++ proxy object are executed in response to the one or more method requests of the graphical user interface.

4. The computer system of claim 3, wherein the C++ graphical user interface executes for a finite length of time and the C++ proxy object and the Java object exist in the C++ environment and the Java virtual machine during the C++ graphical user interface execution.

5. The computer system of claim 3, wherein the Java object is an instance of an instantiated Java class and the C++ proxy object is created as a result of the instantiation of the Java class.

6. The computer system of claim 5, wherein the C++ proxy object includes instance data that identifies the Java object and locates the Java object in the Java virtual machine and wherein the instance data is passed from the Java virtual machine to the C++ proxy object when the C++ proxy object is created.

7. The computer system of claim 3, wherein the C++ proxy object includes one or more method names that name the one or more methods of the Java object and wherein the C++ proxy object passes the one or more method names to the base proxy object when calling the one or more functions of the base proxy object.

8. The computer system of claim 7, wherein one or more method IDs identify the one or more methods of the Java object and the base proxy object retrieves the one or more method IDs using the one or more method names provided by the C++ proxy object.

9. The computer system of claim 8, wherein the base proxy object passes the one or more method IDs to the Java virtual machine when making the one or more JNI API calls across the JNI boundary to call the one or more methods of the Java object.

10. The computer system of claim 8, wherein the base proxy object caches the one or more method IDs in a C++ hash table that is accessible by the C++ proxy objects and the base proxy object.

11. The computer system of claim 2, wherein the Java object is one of the following: a user object, for adding or modifying a user; a node object, for adding or modifying a node; a node group object, for adding or modifying a node group; a tool object, for adding or modifying a tool; and a role object, for adding or modifying a role.

12. The computer system of claim 1, wherein the base proxy object further comprises a mapping mechanism for mapping Java data types to C++ data types.

13. A method for efficient accessing of Java objects and methods by C++ graphical user interfaces, the method comprising:
   a C++ graphical user interface issuing a method request to a C++ proxy object;
   the C++ proxy object passing method data to a base proxy object based on the method request;
   the base proxy object processing the method data, comprising:
      getting a method ID based on the method data;
      issuing JNI API calls with the method ID to call the Java method; and
   a Java object executing a Java method based on the processed method data.

14. The method of claim 13, further comprising, if the executed Java method is a get method, returning a pointer to C++ data.

15. The method of claim 13, wherein the C++ proxy object includes one or more methods and the C++ graphical user interface issuing a method request to a C++ proxy object comprises executing callback code that invokes a C++ proxy object method.

16. The method of claim 13, wherein base proxy object includes one or more functions and the C++ proxy object passing method data to a base proxy object based on the method request comprises processing the method request and calling a base proxy object function, wherein the base proxy object function call includes method data.

17. The method of claim 16, wherein the base proxy object processing the method data further comprises:
   executing the called base proxy object function.

18. A method for efficient accessing of Java objects and methods by C++ graphical user interfaces, the method comprising:
   a C++ graphical user interface issuing a method request to a C++ proxy object;
   the C++ proxy object passing method data to a base proxy object based on the method request;
   a Java object executing a Java method based on the processed method data;
   the base proxy object processing the method data, comprising
      obtaining the Java object via a JNI API call, wherein Java object instance data is passed through a JNI API; and
      initiating C++ proxy object linkage to the Java object, wherein the Java object instance data is used to create the C++ proxy object.

19. A computer readable medium containing instructions for enabling the efficient accessing of Java objects and methods by non-Java graphical user interfaces, by:
   a non-Java graphical user interface issuing a method request to a non-Java proxy object;
   the non-Java proxy object passing method data to a base proxy object based on the method request;
   the base proxy object processing the method data, comprising:
      petting a method ID based on the method data;
      issuing JNI API calls with the method ID to call the Java method; and
   a Java object executing a Java method based on the processed method data.

20. The computer readable medium of claim 19, wherein the non-Java graphical user interfaces are C++ graphical user interfaces.

* * * * *